United States Patent [19]

Uhler

[11] 3,818,130

[45] June 18, 1974

[54] READING PACER FOR EDUCATIONAL TELEVISION

[75] Inventor: Marcus H. Uhler, Pittsburgh, Pa.

[73] Assignee: Westinghouse Electric Corporation, Pittsburgh, Pa.

[22] Filed: Jan. 9, 1973

[21] Appl. No.: 322,240

[52] U.S. Cl. ......... 178/7.5 R, 35/35 B, 178/DIG. 35

[51] Int. Cl. ........................... H04n 5/24, H04n 5/48

[58] Field of Search... 178/7.5 R, DIG. 35, DIG. 30, 178/DIG. 6; 35/35 B; 340/324 A, 324 AD

[56] References Cited

UNITED STATES PATENTS

| | | | |
|---|---|---|---|
| 2,240,420 | 4/1941 | Schnitzer | 178/7.1 |
| 3,179,004 | 4/1965 | Stoyanoff et al. | 35/8 R |
| 3,673,324 | 6/1972 | Ito et al. | 178/6.8 |
| 3,721,021 | 3/1973 | Stewart et al. | 35/35 B |
| 3,757,041 | 9/1973 | Thorpe et al. | 178/7.2 |

*Primary Examiner*—Howard W. Britton
*Assistant Examiner*—Michael A. Masinick
*Attorney, Agent, or Firm*—M. P. Lynch

[57] ABSTRACT

A reading pacer for educational television systems wherein blanking pulses of increasingly greater widths are employed to blank out successive lines of printed material appearing on a television screen starting from the top of the screen and progressing to the bottom. A ramp generator under the control of the viewer of the screen is used to control the generation of blanking pulses of successively greater widths and, hence, the rate at which successive lines of printed material on the screen are blanked out.

5 Claims, 3 Drawing Figures

READING PACER FOR EDUCATIONAL TELEVISION

BACKGROUND OF THE INVENTION

Figure 1:
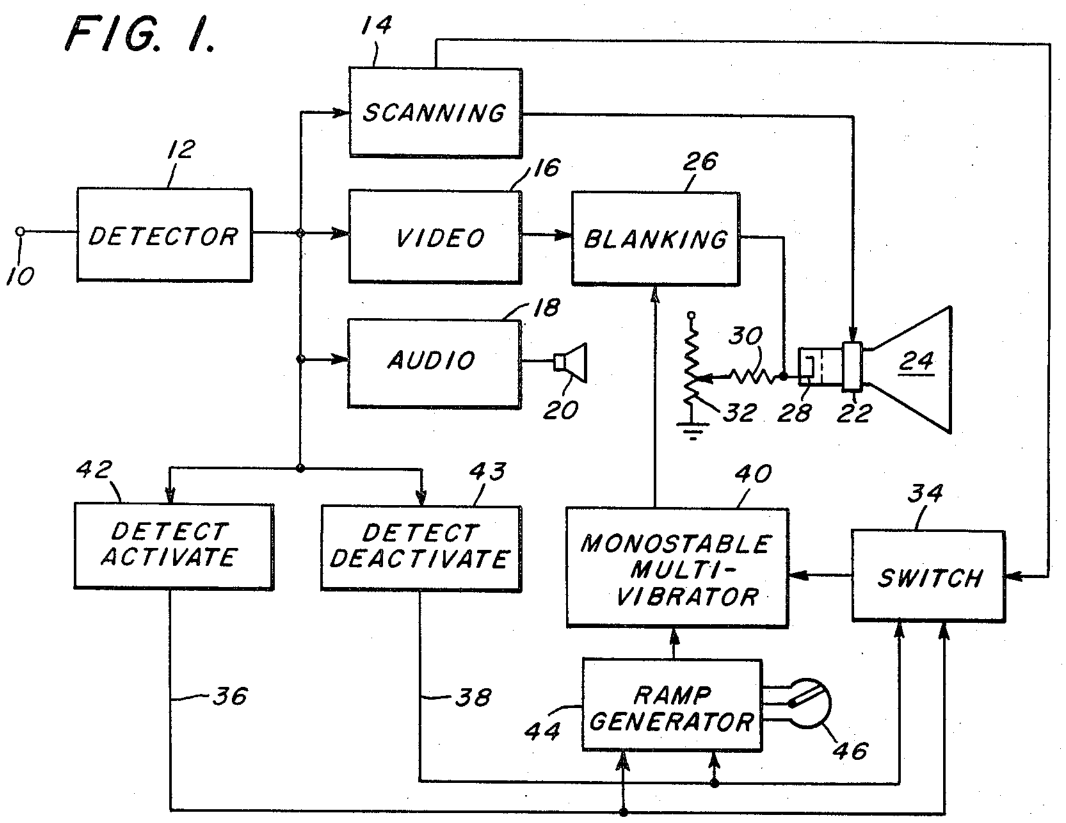

As is known, a reading pacer is a device used to improve reading skills. Typically, it consists of a cover or screen that moves down over reading material. Each line of printed material on a page is successively covered, starting with the first or top line. Thus, the student or viewer is forced to read at a minimum speed and is prevented from having regressions.

In the case of printed material appearing in successive lines on a television picture tube, pacing or successive covering the printed material can be accomplished at the studio, camera or transmitting end of the television system. In this respect, the camera can pan the printed material from top to bottom. Alternatively, the camera and page may be fixed, and mechanical or electronic blanking may be extended from the top of the field to the bottom. All of these methods give the same display on each receiver or monitor. However, as will be understood, the reading speed of individual students viewing the respective television picture tubes will vary such that the pacer rate may be too slow for some and, at the same time, too fast for others. For this reason, control of blanking at the transmitting end of the system is not altogether satisfactory and in some cases may make it more difficult for the student using the educational television system.

SUMMARY OF THE INVENTION

In accordance with the present invention, an educational television system incorporating a reading pacer is provided wherein blanking or successive line covering is controlled at the receiver; while the start of blanking and the maximum blanking time is controlled at the transmitter. In this manner, the speed of the pacer can be individually set for each viewer. Thus, in an educational television system, each receiver becomes an individual reading pacer, notwithstanding the fact that the same signal is transmitted to each receiver.

Specifically, there is provided means in a television receiver for deriving a video signal representing successive lines of printed material to be displayed on the picture tube screen, blanking circuit means for applying the video signal to the picture tube, and means for applying blanking pulses of successively wider widths to the blanking circuit means to blank out a portion of the video signal, each blanking pulse having a leading edge coinciding substantially with a vertical sync pulse applied to the picture tube. Further means under the control of the viewer of the screen are provided for controlling the rate at which successive blanking pulses increase in width and, hence, the rate at which successive lines of printed material are covered or blanked out.

In the preferred embodiment of the invention, the blanking pulses are derived from a monostable multivibrator whose switching period is, in turn, controlled by the output of a ramp generator. The arrangement is such that as the ramp increases in amplitude, so also will the width of successive blanking pulses applied to the blanking circuit. The leading edge of each blanking pulse, however, occurs essentially simultaneously with the occurrence of a vertical sync pulse applied to the television picture tube; and it will be appreciated that in this manner the blanking pulse starts at the top of the screen of the picture tube and persists for a time period dependent upon the amplitude of the ramp. The ramp generator, however, is under the control of the viewer of the screen; and, hence, the rate at which successive lines of printed material are blanked out is also under the control of the viewer. The initiation and termination of the ramp can be by way of enabling and disabling signals sent from the transmitter which control the opening and closing of a switch which applies the vertical sync pulses to the monostable multivibrator.

Figure 2:
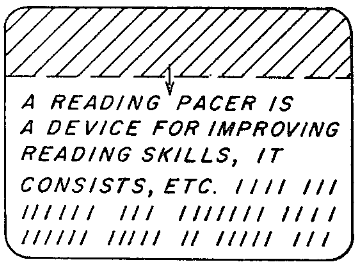
Figure 3:
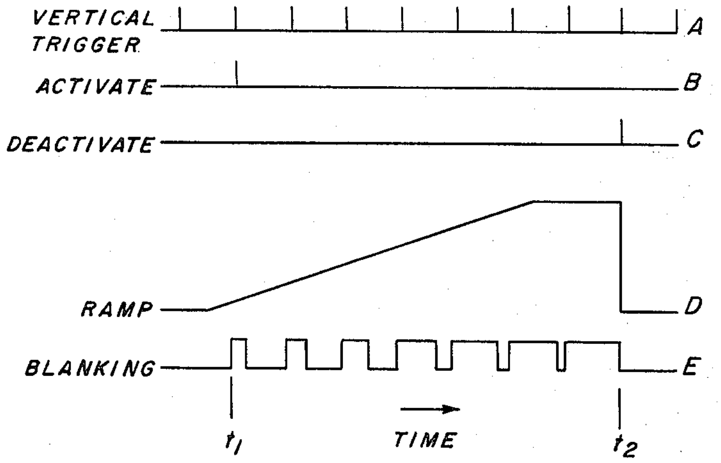

The above and other objects and features of the invention will become apparent from the following detailed description taken in connection with the accompanying drawings which form a part of this specification, and in which:

FIG. 1 is a block schematic circuit diagram illustrating one embodiment of the invention;

FIG. 2 graphically illustrates the manner in which successive lines of reading material appearing on a television picture tube are blanked out; and FIG. 3 comprises waveforms illustrating the operation of the circuitry of FIG. 1.

Referring to FIG. 1, the system shown discloses in general outline a television receiver having an input terminal 10 to which a modulated television signal is applied as received from an antenna or the like. After passing through a detector or demodulator 12, the detected signals are applied to either a scanning circuit 14, a video section 16 or an audio section 18. Each of the circuits includes a filter for separating the respective scanning, video and audio signals from the remainder of the detected television signal, all in accordance with well-known procedures. The signal passing through the audio section 18, of course, is applied to a loud-speaker 20 or the like. The output of the scanning circuit 14 is applied to the deflection system 22 of a CRT picture tube 24. The video signal passing through the video section 16 is applied through a blanking circuit 26 to the cathode 28 of the tube 24. The cathode 28 is also connected through resistor 30 to rheostat 32 to provide brightness control in accordance with usual procedures.

The system of the invention can be used for both color television signals as well as black and white signals; however, for purposes of simplicity, it will be assumed that the system described is for a black and white receiver; and the chromanance intelligence will be ignored.

The scanning circuitry 14 applies sync pulses to the horizontal deflection coils of the tube 24 to initiate each successive horizontal scan of an electron beam across the face of the tube 24. Additionally, it provides vertical sync pulses which momentarily blank out or cut off the electron beam while causing the beam, at the completion of one frame, to sweep back up to the top of the tube where a successive frame is initiated. These vertical sync pulses are used to produce vertical trigger pulses, illustrated as waveform A in FIG. 3, which are applied to a switch 34. The switch 34, in turn, is opened or closed by means of signals on leads 36 and 38.

In order to close switch 34 and apply vertical trigger pulses to a monostable multivibrator 40, a tone signal superimposed on the audio signal or the like is sent from a transmitter and, after detection in detector 12, passes through a filter or other device for detecting the activate signal, this device being generally indicated by the reference numeral 42 in FIG. 1. On the other hand, when it is intended to open the switch 34 and prevent the application of vertical trigger pulses to the monostable multivibrator 40, a second tone signal or the like is sent from the transmitter and, after detection in circuit 43, appears on lead 38 to open switch 34.

As is known, a monostable multivibrator is a circuit which will produce output pulses whose leading edges coincide with trigger pulses applied to the circuit, and whose duration can be made to be dependent upon an externally applied voltage. In the present invention, the externally applied voltage, appearing as waveform D in FIG. 3, is supplied by means of a ramp generator 44. The slope of the ramp (waveform D of FIG. 3) is varied by means of a rheostat 46 or the like under the control of the individual viewing the face of the tube 24. Hence, by varying the position of the rheostat 46, the slope of the ramp at the output of the ramp generator can be varied to thereby change the width of successive pulses at the output of multivibrator 40. The pulses at the output of circuit 40 are applied to the blanking circuit 26, which, in effect, acts as a gate.

The operation of the circuit of FIG. 1 can best be understood by reference to FIG. 3 wherein waveform A represents the vertical trigger pulses applied to switch 34; waveforms B and C represent the activate and deactivate pulses detected by circuits 42 and 43, respectively; waveform D represents the ramp at the output of generator 44; and waveform E represents the blanking signal at the output of multivibrator 40 applied to the blanking circuit 26. The vertical trigger pulses (waveform A) will be produced continually and will occur at the beginning of each scanning field of the CRT tube 24. At time $t_1$, it will be assumed that an activate signal is sent by a transmitter. This is detected by circuit 42 to produce a pulse in waveform B which closes the switch 34. Hence, the vertical trigger pulses (waveform A) are now applied to the multivibrator 40. At the same time, the pulse on lead 36 is also applied to the ramp generator 44 to initiate the ramp output waveform (waveform D). As a result, the blanking signal at the output of monostable multivibrator 40 (waveform E) comprises a series of pulses each of which has a leading edge corresponding with the trigger pulse in waveform A and a width dependent upon the amplitude of the ramp (waveform D). The result, of course, is that the blanking pulses successively increase in width until the entire picture is blanked out. At time $t_2$, a deactivate signal is sent by a transmitter and is detected by circuit 43 to produce a pulse in waveform C which resets the ramp generator 44 and opens switch 34. The system is now ready for a succeeding cycle of operation.

By virtue of the fact that the slope of the ramp (waveform D) is controlled by a manually operated rheostat 46, the viewer of the CRT tube 24 can control the rate at which successive lines of printed material (FIG. 2) are blanked out. Note from the example given in FIG. 3 that the ramp reaches its maximum amplitude with the picture entirely blanked out before the deactivate signal in waveform C is received. This means, of course, that the student utilizing the device has completed reading the entire printed material in less than the maximum allotted time. However, other students at other receiving tubes having the same printed material thereon may blank out the entire picture before or after the example shown in FIG. 3, depending upon their speed of reading.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a system for blanking out successive lines of printed material appearing on a television picture tube screen starting from the top of the screen and progressing toward the bottom, the combination of:

means in a television receiver for deriving a video signal representing successive lines of printed material to be displayed on the picture tube screen as a single scene;

blanking circuit means in said receiver for applying said video signal to the picture tube;

means for applying blanking pulses of successively wider widths to said blanking circuit means to blank out a portion of the video signal at the receiver, each blanking pulse having a leading edge coinciding substantially with a vertical sync pulse applied to said receiving tube; and means under the control of the viewer of said screen for controlling the width of successive blanking pulses.

2. The system of claim 1 wherein said means for applying blanking pulses to said blanking circuit comprises a monostable multivibrator which is triggered to change stable states by pulses coinciding substantially with vertical sync pulses applied to said picture tube.

3. The system of claim 2 wherein the means under the control of the viewer for controlling the width of successive blanking pulses comprises a ramp generator connected to said monostable multivibrator to progressively increase the widths of the pulses produced by the monostable multivibrator, and means under the control of the viewer of said screen for varying the slope of the ramp at the output of said ramp generator.

4. The system of claim 3 including switch means for applying said pulses coinciding substantially with said vertical sync pulses to said monostable multivibrator, means for detecting a signal transmitted from a transmitter and for producing a pulse to close said switch means, and means for detecting a signal sent from said transmitter to produce a pulse for opening said switch means.

5. The system of claim 4 wherein said pulses are utilized, respectively, to initiate a ramp output from said ramp generator and to reset the ramp generator.

* * * * *